US012645542B2

(12) United States Patent
Piotrowski

(10) Patent No.:  US 12,645,542 B2
(45) Date of Patent:       Jun. 2, 2026

(54) DATA BACKUP DEVICE

(71) Applicant: Computero Inc., Forest Hills, NY (US)

(72) Inventor: Bartosz Piotrowski, Forest Hills, NY (US)

(73) Assignee: Computero Inc., Forest Hills, NY (US)

( * ) Notice: Subject to any disclaimer, the term of this patent is extended or adjusted under 35 U.S.C. 154(b) by 0 days.

(21) Appl. No.: 18/401,442

(22) Filed: Dec. 30, 2023

(65) Prior Publication Data

US 2024/0134750 A1      Apr. 25, 2024

Related U.S. Application Data

(63) Continuation of application No. 17/581,812, filed on Jan. 21, 2022, now Pat. No. 11,899,541.
(Continued)

(51) Int. Cl.
*G06F 12/00*          (2006.01)
*G06F 1/14*            (2006.01)
(Continued)

(52) U.S. Cl.
CPC ............ *G06F 11/1456* (2013.01); *G06F 1/14* (2013.01); *G06F 11/1461* (2013.01);
(Continued)

(58) Field of Classification Search
CPC ............. G06F 11/1456; G06F 11/1448; G06F 11/1458; G06F 11/1461; G06F 11/1466;
(Continued)

(56) References Cited

U.S. PATENT DOCUMENTS

| | | |
|---|---|---|
| 5,950,230 A | 9/1999 | Islam et al. |
| 9,354,683 B2 | 5/2016 | Patiejunas et al. |

(Continued)

FOREIGN PATENT DOCUMENTS

| | | |
|---|---|---|
| KR | 101968262 B1 | 4/2019 |
| WO | 2022159757 A1 | 7/2022 |

(Continued)

OTHER PUBLICATIONS

Extended European Search Report, Application No. 22743280.4-1218 / 4281875 PCT/US202201339, EPO (Aug. 8, 2024).
(Continued)

*Primary Examiner* — Shawn X Gu
(74) *Attorney, Agent, or Firm* — Wright IP & International Law; Eric G. Wright

(57)          ABSTRACT

Devices and methods for backing up digital data on storage devices which are automatically selected on an individual basis for digital connection, data exchange and data storage on a scheduled basis and each kept digitally disconnected when not selected and connected for backup data transfer and storage. Devices and methods which backup data on one of a number of an offline storage devices by connecting a selected storage device, backup data onto an offline storage device and then disconnecting the offline storage device, in order to isolate the backed-up data and optionally allow a different storage device to be used for the next back up event.

28 Claims, 6 Drawing Sheets

Related U.S. Application Data

(60) Provisional application No. 63/293,027, filed on Dec. 22, 2021, provisional application No. 63/141,455, filed on Jan. 25, 2021.

(51) Int. Cl.
G06F 11/1446 (2026.01)
G06F 21/56 (2013.01)

(52) U.S. Cl.
CPC ........ G06F 11/1466 (2013.01); G06F 21/568 (2013.01); *G06F 2201/80* (2013.01)

(58) Field of Classification Search
CPC ...... G06F 1/14; G06F 21/568; G06F 2201/80; G06F 2213/4004
See application file for complete search history.

(56) References Cited

U.S. PATENT DOCUMENTS

| | | | |
|---|---|---|---|
| 10,498,821 | B1 | 12/2019 | Bono et al. |
| 11,032,069 | B2 | 6/2021 | Michael |
| 11,074,332 | B2 | 7/2021 | Michael |
| 11,233,653 | B2 | 1/2022 | Michael et al. |
| 11,677,546 | B2 | 6/2023 | Michael |
| 11,899,541 | B2 | 2/2024 | Piotrowski |
| 12,001,298 | B2 | 6/2024 | Piotrowski et al. |
| 2006/0080515 | A1 | 4/2006 | Spiers et al. |
| 2006/0253731 | A1 | 11/2006 | Petruzzo |
| 2008/0288498 | A1 | 11/2008 | Hinshaw et al. |
| 2012/0078858 | A1 | 3/2012 | Nagpal et al. |
| 2012/0110338 | A1 | 5/2012 | Druschel et al. |
| 2014/0143460 | A1 | 5/2014 | Hansen et al. |
| 2015/0365237 | A1* | 12/2015 | Soffer .................. G06F 13/105 726/20 |
| 2017/0177854 | A1 | 6/2017 | Gligor et al. |
| 2018/0341611 | A1 | 11/2018 | Whittington |
| 2019/0196924 | A1 | 6/2019 | Gregg et al. |
| 2019/0327135 | A1 | 10/2019 | Johnson et al. |
| 2019/0391882 | A1 | 12/2019 | Yevtushenko et al. |
| 2021/0006407 | A1 | 1/2021 | Soffer |
| 2021/0066927 | A1 | 3/2021 | Robinson et al. |
| 2021/0397522 | A1 | 12/2021 | Owen et al. |
| 2022/0237085 | A1 | 7/2022 | Piotrowski |
| 2022/0357891 | A1 | 11/2022 | Wang et al. |
| 2024/0054055 | A1 | 2/2024 | Piotrowsk et al. |
| 2024/0394148 | A1 | 11/2024 | Piotrowsk et al. |
| 2024/0419558 | A1 | 12/2024 | Piotrowski |

FOREIGN PATENT DOCUMENTS

| | | |
|---|---|---|
| WO | 2022159779 A1 | 7/2022 |
| WO | 2023122225 A1 | 6/2023 |
| WO | 2023122225 A8 | 2/2024 |
| WO | 20231222225 A8 | 2/2024 |
| WO | 2024137892 A2 | 6/2024 |

OTHER PUBLICATIONS

PCT International Preliminary Report On Patentability, Application No. PCT/US2022/013395, IPEA/US (Nov. 3, 2023).

PCT International Preliminary Report On Patentability, Application No. PCT/US2022/013428, IPEA/US (Aug. 9, 2023).

PCT International Search Report, Application No. PCT/US2022/053734, ISA/US (Apr. 5, 2023).

PCT International Search Report, Application No. PCT/US2022/013395, ISA/US (Apr. 26, 2022).

PCT Written Opinion of the International Searching Authority, Application No. PCT/US2022/013395, ISA/US (Apr. 26, 2022).

PCT International Search Report, Application No. PCT/US2022/013428, ISA/US (Apr. 26, 2022).

PCT Written Opinion of the International Searching Authority, Application No. PCT/US2022/013428, ISA/US (Apr. 26, 2022).

PCT Written Opinion of the International Searching Authority, Application No. No. PCT/US2023/085267, ISA/US (Apr. 26, 2024).

PCT International Search Report, Application No. PCT/US2023/085267, ISA/US (Apr. 26, 2024).

PCT International Preliminary Report On Patentability, Application No. PCT/US2022/053734, IPEA/US (Apr. 3, 2024).

PCT Written Opinion of the International Searching Authority, Application No. PCT/US2022/053734, ISA/US (Apr. 5, 2023).

PCT Written Opinion of the International Searching Authority, Application No. PCT/US2024/060955, ISA/US (Feb. 13, 2025).

PCT International Search Report, Application No. PCT/US2024/060955, ISA/US (Feb. 13, 2025).

Min et al., "Efficient Deduplication Techniques For Modern Backup Operation", IEEE Transactions on Computers vol. 60, No. 6, 824-840, (Jun. 2011), https://oslab.kaist.ac.kr/wp-content/uploads/esos_files/publication/journals/international/Efficient_Deduplication_Techniques_for_Modern_Backup_Operation.pdf?ckattempt=2.

Extended European Search Report, Application No. 22908848.9—1218 / 4453741 PCT/US2022053734, EPO (Oct. 8, 2025).

Narayan, "Automate Rotating Offline Backups via USB Hubs to Avoid Ransomware" (Jul. 22, 2019), Acroname Blog, https://acroname.com/blog/automate-rotating-offline-backups-usb-hubs-avoid-ransomware (Sep. 20, 2025).

* cited by examiner

FIG. 3

DATA BACKUP DEVICE

CROSS REFERENCE TO RELATED APPLICATIONS

This patent application is a continuation application of copending U.S. nonprovisional application Ser. No. 17/581, 812 titled "Automated Offline Backup Device" (originally titled "Data Backup Device") filed Jan. 21, 2022, which claims benefit of the filing date of U.S. provisional patent application No. 63/141,455 titled "Data Backup Device" filed Jan. 25, 2021, and U.S. provisional patent application No. 63/293,027 titled "Data Backup Device" filed Dec. 22, 2021.

INCORPORATION BY REFERENCE

This patent application incorporates by reference in its entirety copending U.S. nonprovisional application Ser. No. 17/581,812 titled "Automated Offline Backup Device" filed Jan. 21, 2022, which incorporates by reference in its entirety U.S. provisional patent application No. 63/141,455 titled "Data Backup Device" filed Jan. 25, 2021 and U.S. provisional patent application No. 63/293,027 titled "Data Backup Device" filed Dec. 22, 2021.

This patent application incorporates by reference in its entirety U.S. provisional patent application No. 63/141,455 titled "Data Backup Device" filed Jan. 25, 2021.

This patent application incorporates by reference in its entirety U.S. provisional patent application No. 63/293,027 titled "Data Backup Device" filed Dec. 22, 2021.

FIELD OF THE INVENTION

The present invention relates to devices and methods regarding digital security, off-line backup technology and data backup technology.

BACKGROUND OF THE INVENTION

Hackers use ruthless techniques to first gain access to information technology (IT) systems, copy the data therein, destroy backups, and even encrypt all of the data such systems store. Hackers use ransomware designed to force victims to pay for decryption codes. In some instances, hackers, viruses and/or malware can be used to delete some, or all, of the data stored on computer system. Such crimes are being committed with increased frequency and sophistication. The consequences of such crimes can be devastating for businesses, victims and those affected by consequences of such crimes.

In the current technological environment, data is everywhere. Images, videos, documents, contacts, databases and other files are critical to creating and/or sustaining people's livelihoods, means of earning a living, or are important in their personal lives and/or business. Such data can easily be lost, damaged, corrupted, stolen, deleted, made inaccessible, or otherwise interfered with by hackers, malicious individuals or through negligence or equipment failure. Cloud-based storage can also be affected by such destructive influences. Data that is connected to computers, systems, networks, online and/or in the cloud is vulnerable to damage, destruction, modification, or denial by lock-out.

Technological solutions that defend against cybercrime and destruction or loss of victim's data are desperately needed.

SUMMARY OF THE INVENTION

This disclosure regards methods and devices for storing backups offline.

In its many and varied embodiments herein are backup devices, systems, methods, processes and technologies for storing data by taking data to be protected off-line at intervals, such that the data to be protected is not accessible to anyone without physical access to the device upon which the data to be protected has been backed up and/or stored outside of the host, or source of that data.

In an embodiment, a device can have: a host interface having a means for exchanging a data with a host; a multiplexer for directing the data to a storage device interface; the multiplexer can have a microcontroller; the microcontroller can have a processor having a non-transitory memory and having a processor executing computer readable program code which executes a rule-based program logic that processes a schedule data against a schedule parameter and selects a first storage device for receiving the data; the microcontroller processor executing computer readable program code executes a rule-based program logic that controls the multiplexer directing the data to the first storage device based upon processing of the schedule data; and a means for exchanging data from the multiplexer to the first storage device having a non-transitory memory configured to store data.

In an embodiment, the device can have a processor executing computer readable program code which executes a rule-based program logic that processes a schedule data against a schedule parameter and selects a first storage device for receiving the data from a plurality of storage devices.

In an embodiment, the device can have a processor executing computer readable program code which executes a rule-based program logic that processes a schedule data against a schedule parameter and selects a first storage device for receiving the data from a plurality of 2, or 5, or 7, or 10, or 12, or 14, or 30, or 31, or 365 or more, storage devices.

In an embodiment, the device can have a processor executing computer readable program code which executes a rule-based program logic that processes a schedule data against a schedule parameter and selects a first storage device for receiving the data from a plurality of 3, or 5, or 7, or 12, or 13, or 14, or 30, or 31, or greater, storage devices.

In an embodiment, the device can have a processor executing computer readable program code which executes a rule-based program logic that processes a schedule data against a schedule parameter and selects a first storage device for receiving the data from a single storage device, or a plurality of storage devices, in a range of 2 to 31, or greater, storage devices.

In an embodiment, the device can have a plurality of a host interface for receiving data form one or more of a host.

In an embodiment, the device can have a plurality of means for exchanging data from the multiplexer to one, or more, storage devices.

In an embodiment, the device can have a microcontroller having a processor having a non-transitory memory and having a processor executing computer readable program code which executes a rule-based program logic that identifies and directs the data to a storage device. In an embodiment, the processor can be a multiplexer executing computer readable program code which executes a rule-based program logic that identifies and directs the data to a storage device.

In an embodiment, the device can have a processor which executes a rule-based program logic that identifies and directs the data to a storage device based upon processing of a schedule data against a schedule parameter.

In an embodiment, a method can comprise the steps of: providing a multiplexer having a microcontroller having a processor having a non-transitory memory and having a processor executing computer readable program code which executes a rule-based program logic that processes a schedule data against a schedule parameter; providing a data interface between the multiplexer and a host having a means for exchanging a data with a host; providing a first storage device having a non-transitory memory configured to store a data; providing a data from the host through the data interface to the multiplexer for storing on the first storage device; providing a schedule data for processing by the microcontroller; process of computer readable program code which executes a rule-based program logic that processes a schedule data against a schedule parameter to select the first storage device; the microcontroller selecting the first storage device; the microcontroller processor executing computer readable program code executes a rule-based program logic that controls the multiplexer directing the data to the first storage device based upon processing of the schedule data; providing a means for the multiplexer exchanging data from the multiplexer to the first storage device having a non-transitory memory configured to store data; the microcontroller controlling the multiplexer to transfer the data through the means for the multiplexer exchanging data from the multiplexer to the first storage device for storage in the non-transitory memory of the first storage device; and storing the data in the non-transitory memory of the first storage device.

The method can also have the steps of: digitally connecting the first storage device until prior to transfer of the data; and disconnecting the first storage device after transfer of the data.

The method can also have the steps of: providing a plurality of storage devices; digitally connecting only one of the plurality of storage devices to the multiplexer for the purpose of transferring and storage of the data on the connected device; and disconnecting the connected storage device after that data has been transferred and stored.

The method can also have the steps of: providing a plurality of offline, or physically disconnected, digital storage devices which are respectively and selectively used to backup host data one at a time depending upon a selection criterion; digitally connecting a selected storage device; transferring a data to the storage device; and disconnecting the selected storage device from receiving additional of the data after the transfer is complete.

The method can also have the step of controlling the selection of a storage device on which to store the data based upon a temporal criterion.

The method can also have the steps of: controlling the selection of a storage device on which to store the data based upon a time and date, or time and day, criteria.

The method can also have the step of controlling the selection of a storage device on which to store the data based upon a backup scheduling criterion.

The method can also have the step of protecting data which is a backup data by disconnecting the storage device from receiving data from the host.

The method can also have the steps of protecting data which is a backup data by disconnecting the storage device from receiving data from the microcontroller.

The method can also have the steps of protecting data which is a backup data by disconnecting the storage device by means of a digital switch controlled by the microprocessor.

The method can also have the steps of protecting data which is a backup data by disconnecting the storage device by means of a physical switch which disconnects the storage device from the multiplexer.

In an embodiment, a device can have: a plurality of host interfaces having a means for exchanging data with at least one host; a plurality of USB hubs directing the data to a storage device interface; a microcontroller configured to control a plurality of interface control chips; the microcontroller having a processor having a non-transitory memory and having a processor executing computer readable program code which executes a first rule-based program logic that processes schedule data against a schedule parameter and enables a first storage port from a plurality of storage ports; said microcontroller processor executing computer readable program code which executes a second rule-based program logic that processes the schedule data against the schedule parameter and selects a storage device interface for receiving the data; the microcontroller processor executing computer readable program code which executes a third rule-based program logic that controls the plurality of USB hubs directing the data through the first USB hub to the storage device interface based upon processing of the schedule data; and a means for exchanging the data from the plurality of USB hubs to the storage device having a non-transitory memory configured to store data.

In another embodiment, the device can have a plurality of USB hubs that includes at least one nested USB hub.

In another embodiment, the device can have a storage device for receiving the data that is one of a plurality of storage devices.

In another embodiment, the device can have the microcontroller processor executing computer readable program code which executes a rule-based program logic that processes a schedule data against a schedule parameter and selects the first storage device for receiving the data selects the first storage device from a plurality of storage devices.

In another embodiment, the device can have the microcontroller processor executing computer readable program code which executes a rule-based program logic that processes a schedule data against a schedule parameter and selects the storage device for receiving the data selects the storage device from one or more storage devices and connects the storage device to the at least one host by turning on/off ports using interface control chips In another embodiment, the device can have a display screen for viewing display screen menus and the schedule data, and a control means connected to the display screen for locally adjusting said schedule data.

In another embodiment, the device can have the storage device interface configured to receive the data only when the microcontroller processor has selected the storage device interface.

In another embodiment, the device can have the storage device interface configured to receive the data only when the microcontroller processor has enabled the storage device interface.

In an embodiment, a method can comprise the steps of: providing a plurality of host interfaces having a means for exchanging data with at least one host; providing a plurality of USB hubs directing the data to a storage device interface; providing a microcontroller configured to control the plurality of USB interfaces; providing said microcontroller with a processor having a non-transitory memory; providing the microcontroller a processor with executable computer readable program code which executes a first rule-based program logic that processes schedule data against a schedule parameter and selects a first storage device from a plurality of storage devices; providing said microcontroller processor executing computer readable program code which executes a second rule-based program logic that processes the schedule data against the schedule parameter and selects a storage device interface for receiving the data; providing the microcontroller processor with executable computer readable program code which executes a third rule-based program logic that controls the plurality of USB hubs directing the data through the first USB hub to the storage device interface based upon processing of the schedule data; and providing a means for exchanging the data from the plurality of USB hubs to the storage device having a non-transitory memory configured to store data.

The method can also have a step of: providing at least one of the plurality of USB hubs/multiplexers as a nested USB hub and/or multiplexers.

The method can also have a step of: providing multiple storage devices connected on a USB hub through a multiplexer to be visible to the host.

The method can also have a step of: providing specific storage devices connected on a specific multiplexer through a USB hub to be visible to the host.

The method can also have the steps of: providing a plurality of storage devices; digitally connecting only one of the plurality of storage devices to the first USB hub for the purpose of transferring and storage of the data on the connected device; and disconnecting said connected storage device after that data has been transferred and stored.

The method can also have the steps of: providing a plurality of offline, or physically disconnected, digital storage devices which are respectively and selectively used to backup host data one at a time depending upon selection criteria; digitally connecting a selected storage device, transferring a data to the storage device, and disconnecting the selected storage device from receiving additional of the data after the expiration of a schedule time.

The method can also have a step of: controlling the selection of a storage device on which to store the data based upon a temporal criterion.

The method can also have a step of: controlling the selection of a storage device on which to store the data based upon a time and date, or time and/or day, criteria.

The method can also have the steps of: controlling the selection of a storage device on which to store the data based upon a backup scheduling criteria.

The method can also have a step of: protecting data which is backup data by disconnecting the storage device from receiving data from the host.

The method can also have the steps of: protecting data which is a backup data by disconnecting said storage device from receiving data from said microcontroller.

The method can also have the steps of: protecting data which is a backup data by disconnecting said storage device by means of a digital switch controlled by the microprocessor.

The method can also have the steps of: protecting data which is a backup data by disconnecting the storage device by means of a physical switch which disconnects the storage device from the USB hubs.

The method can also have the steps of: providing a display screen for viewing display screen menus and the schedule data; and providing a control knob connected to the display screen for locally adjusting the schedule data.

In an embodiment, a device can have: a plurality of host interfaces having means for exchanging data with one or more hosts; the one or more hosts each being connected to a respective host interface of the plurality of host interfaces for directing the data to a storage device interface; a microcontroller connected to the plurality of host interfaces; the microcontroller having a processor having a non-transitory memory and having a processor executing computer readable program code which executed a rule-based program logic that processes a schedule data against a schedule parameter and turns on a storage device for receiving the data; the microcontroller processor executing computer readable program code executes a rule-based program logic that controls the plurality of host interfaces directing the data to the storage device upon processing of the schedule data; and a means for exchanging data from the host interface to the storage device having a non-transitory memory configured to store data.

In another embodiment, the device can have: the storage device interface configured to receive the data only when the microcontroller processor has selected the storage device interface.

In an embodiment, a method can comprise the steps of: providing a plurality of storage interfaces having means for exchanging data with one or more hosts; providing said one or more hosts each being connected to a respective host interface of the plurality of host interfaces for directing the data to a storage device interface; providing a microcontroller connected to the plurality of host interfaces; providing said microcontroller with a processor with executable computer readable program code which executes a first rule-based program logic that processes a schedule data against a schedule parameter and turns on a storage device for receiving said data; providing said microprocessor with executable computer readable program code which executes a second rule-based logic that controls the plurality of host interfaces directing the data to the storage device upon processing of the schedule data; and providing a means for exchanging data from the plurality of host interfaces to the storage device having a non-transitory memory configured to store data.

The method can also have the step of: providing said storage device interface configured to receive the data only when the microcontroller processor has selected the storage device interface.

BRIEF DESCRIPTION OF THE DRAWINGS

The present invention in its several aspects and embodiments solves the problems discussed above and significantly advances the technology of cybersecurity and data backups. The present invention can become more fully understood from the detailed description and the accompanying drawings, wherein:

FIG. 3 shows a diagram of an embodiment of controller logic for an embodiment having a multiplexer;

Herein, like reference numbers in one figure refer to like reference numbers in another figure.

DETAILED DESCRIPTION OF THE INVENTION

Definitions

Figure 1:
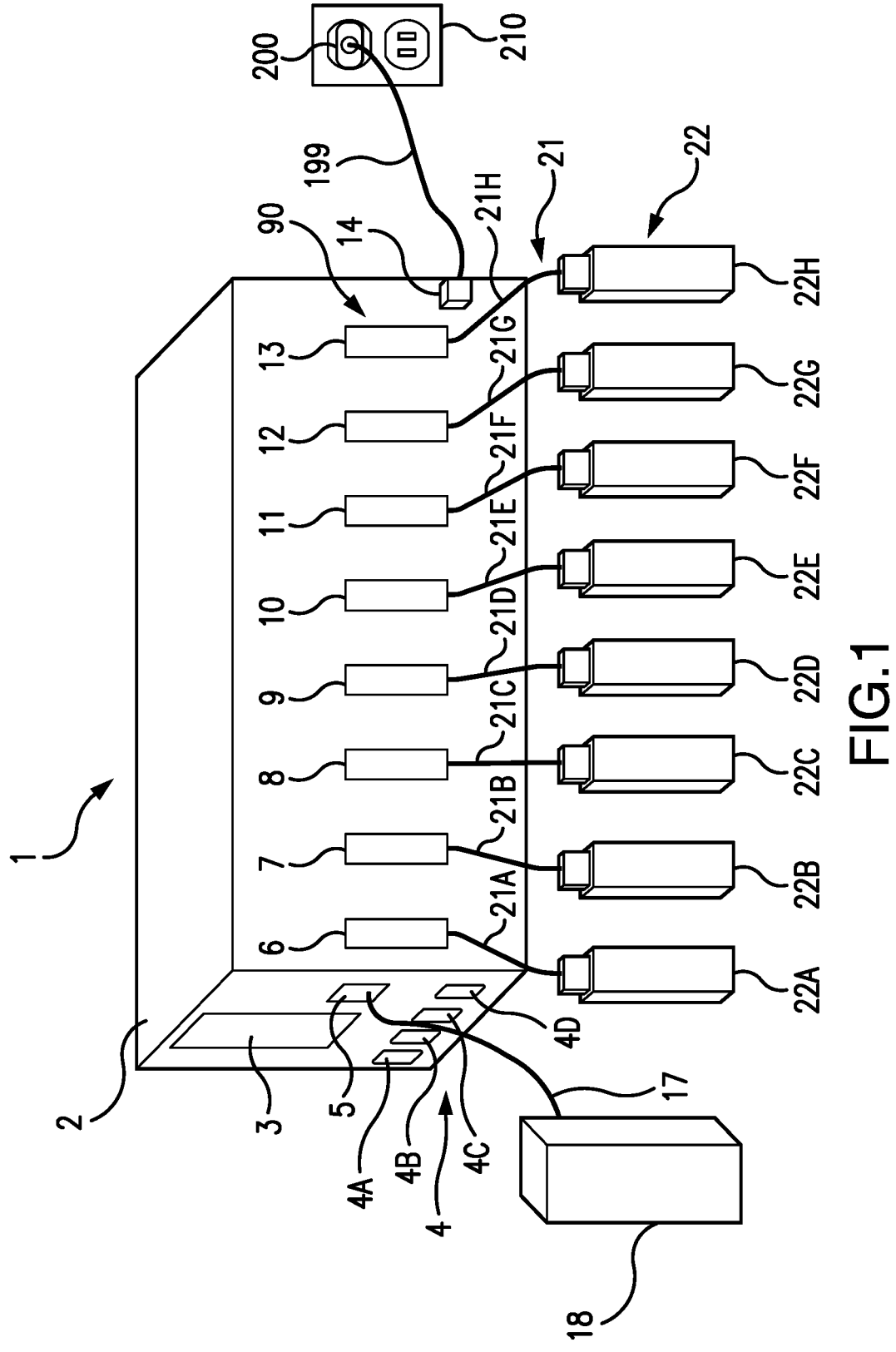
FIG. 1 shows a diagram of an embodiment of an external device.

Herein, in the following description, numerous specific details are set forth in order to provide a thorough understanding of the present disclosure in its many forms and embodiments. It will be readily apparent however, that the present disclosure can be practiced without limitation to these specific details. In other instances, some methods and structures readily understood by one of ordinary skill in the art have not been described in detail so as not to necessarily obscure the present disclosure. As used herein, the terms "a" and "an" are intended to denote at least one of a particular element, the term "includes" means includes by not limited to, the term "including" means including but not limited to, and the term "based on" means based at least in part on. USB Timer—Scheduled Backup Device Selector Devices and methods for backing up digital data on storage devices which are automatically selected on an individual basis for digital connection, data exchange and data storage on a scheduled basis and each kept digitally disconnected, by manipulating either the multiplexer (data selector/digital switch) gates (ON/OFF) also referred to as combination logic circuit or by manipulating the individual USB port interface control (IC) chips using ON/OFF when not selected and connected for backup data transfer and storage. Devices and methods which backup data on one of a number of offline storage devices by connecting a selected storage device, back up data onto it and then disconnecting it, in order to isolate the backed up data and optionally allow a different storage device to be used for the next back-up event/task.

In an embodiment, this device allows the operator to store backups offline for security and storage purposes, and only available during certain pre-scheduled times which can be manipulated by the local device interface, not the host system (e.g. the system being backed up/protected). Hackers would not be able to delete all of the user's backups, thus achieving an automated off-line protection. In this embodiment the operator can set up multiple varying schedules including once only backup, which in an embodiment is disconnected until the operator decides to bring the storage device back online. The device is programmed in such a way that allows the local operator to manipulate the connected storage devices. In this embodiment, it is not possible to remotely change a respective USB storage port 22 status from "on" in which it can exchange data to "off" in which no data is exchanged with that respective USB storage port 22. Likewise, in this embodiment, it is not possible to remotely change a port's status from "off" in which no data is exchanged with the port to "on" in which it can exchange data. Similarly, in this embodiment, it is not possible to remotely change and/or adjust the schedule data. Thus, this design prevents remote hackers from gaining access to storage devices which were already disconnected from the host system.

In addition to its ordinary and customary meaning, herein the term "open" means that there is an active digital pathway for sending and/or receiving data.

In addition to its ordinary and customary meaning, herein the term "closed" means that there is no longer an active digital pathway for sending and/or receiving data.

In addition to its ordinary and customary meaning, herein the term "turn on" means that a particular digital interface, gate or pathway is activated to allow for sending and/or receiving of data. Additionally, "on" means previously activated and/or active to allow sending and/or receiving data.

In addition to its ordinary and customary meaning, herein the term "turn off" means that a particular digital interface, gate or pathway is deactivated and can not send and/or receive data. Additionally, "off" means previously deactivated and/or can not send and/or receive data.

In addition to its ordinary and customary meaning, herein the term "connect" means to digitally activate a pathway to allow sending and/or receiving of data to and/or from a storage device or host. Additionally, "connected" means previously activated and/or active to allow sending and/or receiving data.

In addition to its ordinary and customary meaning, herein the term "disconnect" means to digitally deactivating a pathway which will prevent sending and/or receiving of data to and/or from the storage device or host. Additionally, "disconnected" means previously deactivated and/or can not send and/or receive data.

In addition to its ordinary and customary meaning, herein the term "open" means that there is an active digital pathway for sending and/or receiving data.

In addition to its ordinary and customary meaning, herein the term "closed" means that there is no longer an active digital pathway for sending and/or receiving data.

In addition to its ordinary and customary meaning, herein the term "turn on" means that a particular digital interface, gate or pathway is activated to allow for sending and/or receiving of data. Additionally, "on" means previously activated and/or active to allow sending and/or receiving data.

In addition to its ordinary and customary meaning, herein the term "turn off" means that a particular digital interface, gate or pathway is deactivated and can not send and/or receive data. Additionally, "off" means previously deactivated and/or can not send and/or receive data.

In addition to its ordinary and customary meaning, herein the term "connect" means to digitally activate a pathway to allow sending and/or receiving of data to and/or from a storage device or host. Additionally, "connected" means previously activated and/or active to allow sending and/or receiving data.

In addition to its ordinary and customary meaning, herein the term "disconnect" means to digitally deactivating a pathway which will prevent sending and/or receiving of data to and/or from the storage device or host. Additionally, "disconnected" means previously deactivated and/or can not send and/or receive data.

In an embodiment, this device achieves security to the data backups because the microcontroller that controls the backup process it is isolated. In an embodiment, the microcontroller has a sole role in which it executes a task based on schedule, and that task is to issue commands to the multiplexer to disconnect/connect (close/open) a given storage device port. In an embodiment, this microcontroller runs a program and controls only the multiplexer and is isolated from the host, the data and the storage device. The microcontroller has a direct connection to the Multiplexer(s)/USB hub(s) or interface control chip(s) and does not have a direct control connection to the host. Optionally, or as desired, one or more multiplexer(s) can be used and/or one or more USB hub(s) and/or interface control chips(s). Herein, the term "hub" and USB hub" are used interchangeably. The microcontroller has a predetermined schedule which can be further adjusted to the needs of the user for the purpose of offline data storage/protection. In an embodiment, the microcontroller is isolated from and/or does not come in contact with the data (the multiplexer/USB hubs do). Thus, in such configuration, the microcontroller will not be subject to be exploited by the data being transmitted, e.g. the microcontroller will not be exposed, or subject, to data corruption, viruses, malware and other malicious data or damaging data, or data or components of the data flow from a host, or other source. For example, even if the data being passed to the storage device is malicious, the microcontroller will not be infected, altered or affected. The microcontroller does not process any data that is being transferred from the host to the selected storage device, or vice versa. The microcontroller acts as a "traffic controller" and directs which storage ports are visible to the host system(s). In embodiments, malware that can be protected against includes in non-limiting example: viruses, adware, trojan horse code, worms, ransomware, root kits, bots, and other types of malware.

Furthermore, in an embodiment the microcontroller is also not visible, or subject, to the host or its data flow. Therefore, if the host was compromised, an attacker or malicious event, virus, corrupt data and/or malware, cannot turn on specific ports in the device in order to access, read, delete, or affect, the backups from previous hours/days/weeks/months—held by other storage devices that are offline but still can be physically connected to the device. In other words, if the backup occurs and completes on Friday night and the hackers deploy ransomware on Sunday the Friday's backup has been offline and can not be corrupted by the malware. The operator will be able to simply connect the storage device with Friday's backup directly to the host and restore the affected data.

In an embodiment, the multiplexer does not interpret or store the data; rather—it provides the means and/or capability of data transfer from the host to the selected storage device.

In an embodiment, the multiplexer does not have a microprocessor or memory, therefore it also cannot be exploited by the data traveling through it. The multiplexer comprises of a series of interconnected gates that connect/open and disconnect/close based on directions from a separate interface (lines)—which accept commands sent from the microcontroller and allow the specific gates to connect/disconnect (open/close; turn on/turn off) so that only a particular storage interface is connected to the host.

In an embodiment, data backups can be accessed by a second operator at a second location different than the location of a first host system operated by a first local operator.

The device control can be further extended to a remote location by adding a 4G/5G or Wi-Fi/Bluetooth (Bluetooth also as "BT") module, or other wireless protocol and/or means and/or capability, to the microcontroller, to such that the device can be controlled remotely. More over other wireless or wired communication systems, e.g. such as Ethernet, can also be utilized in the context of this embodiment to allow secure remote control of the device, as well as data transfer. The remote operator can perform all tasks related to scheduling and allowing devices to be on or off line by having the microcontroller send manual control parameters to the multiplexer. This cellular data connection would be independent and isolated from the device's host local network/internet as to not be hacked. The WiFi and Ethernet connection would allow the device to be on the local network—but this can be viewed as riskier if the hackers already penetrated the defenses of the network and can gain access to this device via network and control the active backup device. These features allow an IT professional to maintain the devices, rotate storage devices, or diagnose them as needed. Furthermore—the remote operator can select the active storage device and retrieve any backups through the host's remote connection for the local user, without the local user's interaction.

Definitions

"About", Ranges & Tolerances

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance are inherent in mechanical design and the numbers disclosed herein are intended to be construed to allow for such factors (in non-limiting e.g., ±10 percent of a given value). Likewise, the claims are to be broadly construed in their recitations of numbers and ranges.

Every numerical range given throughout this specification will include every narrower numerical range that falls within such broader numerical range, as if such narrower numerical ranges were all expressly written herein. As regarding ranges and endpoints, every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein.

Additional Definitions

In addition to its ordinary and customary meaning "host interface" expressly encompasses USB ports to interconnect two devices (host and device) for the purpose of storing backups.

In addition to its ordinary and customary meaning "multiplexer" expressly encompasses a device that using gates opens and closes connections to select USB ports and allows communication with the host.

In addition to its ordinary and customary meaning "microcontroller" expressly encompasses an Arduino, or Raspberry Pi, ESP32 or other "system on a chip microcontroller" type device to control the multiplexer.

The data storage device 1 can use USB hardware and software. In addition to its ordinary and customary meaning "USB" encompasses USB protocols and compatible devices, e.g. USB 1.0, USB 1.1, USB 2.0, USB 3.0, USB 3.1, USB 3.2, USB 4.0, Type A, Type B, Type C and USD Mini and USB Micro connections, as well as other USB protocols and devices.

In addition to its ordinary and customary meaning "schedule data" expressly encompasses a logical schedule which enables the microcontroller to send signals to multiplexer to connect/disconnect (open/close) ports visible to the host.

In addition to its ordinary and customary meaning "schedule data" expressly encompasses a temporal data, such as a time data and/or a day and/or date data that can be processed by the microcontroller for comparison against a schedule parameter. Additionally, in addition to its ordinary and customary meaning "schedule data" expressly encompasses scheduling a task to run at a specified date/time.

In addition to its ordinary and customary meaning "schedule parameter" expressly encompasses date and/or time for such task to be executed.

In addition to its ordinary and customary meaning "storage device" expressly encompasses a device which is connected to the USB storage ports and is available for storing data.

In addition to its ordinary and customary meaning, a means and/or capability for exchanging data with a host expressly encompasses having the host store the data on a selected storage device.

In addition to its ordinary and customary meaning a means and/or capability for exchanging data with a storage device expressly encompasses storing/deleting/reading or manipulating data stored on a storage device by the host system.

In addition to its ordinary and customary meaning, a "means for exchanging data" between host 18 and data backup device 1 expressly encompassing a universal serial bus which connects the host 18 to backup device 1 through which data is sent and/or received between the host 18 and data backup device 1. A "means for exchanging data" expressly encompasses structures, devices protocols for the transfer of data and/or data packets to be stored or read from the host 18 and/or backup device 1. Such structures, devices protocols encompass for example computer bus interfaces, e.g. USB (universal serial bus), NvMe (NvMe, e.g. using a PCI bus) and SATA (serial advanced technology attachment) as well as the cables, connectors and protocols for such bus interfaces. Additionally, A "means for exchanging data" expressly encompasses software and middleware, as well as hardware for achieving an exchange of data between the host 18 and data backup device 1 and vice versa.

Herein, a "means for exchanging data" between data backup device 1 data storage devices, e.g. USB or other digital storage device, is the universal serial bus which includes USB ports, hubs and/or multiplexers which communicate using the same protocol, ensuring precise data communication to and from the storage device for the purpose of storing data and/or backup data.

A "means for exchanging data" expressly encompasses structures, devices protocols for the transfer of data and/or data packets to be stored or read from the data storage device 22 and/or data backup device 1. Such structures, devices protocols encompass for example computer bus interfaces, e.g. USB (universal serial bus), SATA (serial advanced technology attachment), NvMe (non-volatile memory express), as well as the cables, connectors and protocols for such bus interfaces. Additionally, A "means for exchanging data" expressly encompasses software and middleware, as well as hardware for achieving an exchange of data between the data storage device 22 and data backup device 1 and vice versa.

FIG. 1

FIG. 1 shows a diagram of an embodiment of an external device.

FIG. 1 shows an embodiment of a data backup device 1, having a plastic enclosure 2, a display screen 3 and menu control buttons 4, e.g. 4A, 4B, 4C and 4D (menu control buttons 4A-4D). In the FIG. 1 embodiment, the data backup device 1 has a USB host port 5 which can be connected to a host system 18 via a USB cable 17. This embodiment has a plurality of USB ports which connect to data storage devices, herein referred to as "USB storage ports", e.g. USB storage ports 90, e.g. USB storage ports respectively 6, 7, 8, 9, 10, 11, 12 and 13 (USB storage ports 6-13). FIG. 1 shows an example of an optional USB extension cable 21, e.g. 21A, 21B, 21C, 21D, 21E, 21F, 21G and 21H (data storage devices 21A-21H), to a data storage device 22, e.g. 22A, 22B, 22C, 22D, 22E, 22F, 22G, 22H (data storage devices 22A-22H). FIG. 1 also shows the data backup device 1 power port 14 having a 5V power cord 199 and adapter 200 plugged into power port 14 which can be plugged into a US 110V electrical wall socket 210 to power the data backup device 1.

In an embodiment, the disclosure herein results in a foolproof backup that is not accessible to an internet or otherwise connected user. The data backup device 1 provides a foolproof backup this is both automated in regards to the schedule, e.g. day and/or day, and time, by which back-up data is received and stored and then taken offline to secure that backed up data without manual intervention.

In addition to its ordinary and customary meaning, "data storage device" expressly encompasses USB flash drives, thumb drives, hard drives, solid state drives (SSD), solid state flash memory, memory chips, memory cards, or other nonvolatile data storage device.

The data storage device 22 types which can be used with data backup device 1 can be the same or different. For example, the operator can use different storage media for different types of backups. For example—a small, e.g. less than 64 GB of, database backup which runs daily can be sent to a USB flash drive having a memory capacity compatible with the small, less than 64 GB, backup data storage requirement. In another example, where a full system backup, e.g. having greater than 500 GB of day, that runs on Saturday would necessitate that use of a larger hard drive what could record that amount of backup storage data. An operator who would like to have the fastest transfer rate may elect to use solid state drives for backups that are scheduled during the day, and hard drives for backups at night or Saturdays.

The data storage device 22 types which can be used with data backup device 1 can be the same or different. In another example different types of data storage devices 22 can be used.

Given that these data backup device consists of USB storage ports—there is a variety of USB devices that can be plugged into any of them the user can plug a USB flash drive into USB storage port 6 and plug external SSD in port 7, and plug an external hard drive in port 8.

In an embodiment, the backup is an off-line backup. An off-line backup is not available to anyone online. An off-line backup is not available to anyone from the internet. An off-line backup is not available to anyone on an intranet, or otherwise connected to the system being backed up. In other words, in embodiments, only the person with physical access to the device can control the operation of the device, and therefore controls access to the storage devices attached.

Criteria Selection of a Storage Device

End users will select the storage device based on their data size requirements. For example, a system with 10 GB of data can be backed up using a 16 GB USB flash drive, or a number of 16 GB USB flash drives setup for each day of the week and rotated weekly/monthly as desired.

Organizations with small amounts of data, e.g. 1 GB can for example elect to use several USB flash drives with storage of 4 GB to make sure all the data fits and allows for some additional growth in the future.

Organizations with more data, e.g. greater than 500 GB for example, can elect to use a number of external hard drives with storage of 1 TB, or other values of memory, to make sure all the data fits and allows for some additional growth in the future.

Organizations with even more data, e.g. greater than for example 10 TB can elect to store their data on external hard drives with capacity of 12 TB or 16 TB by connecting several of these drives to the storage ports of the device.

How a Storage Device is Connected to Receive Data

Once the microcontroller determines that it is time to connect a particular port to the host, it sends a signal to the multiplexer to perform the operation. The external device appears as if "plugged in" to the host system. The host system at a scheduled interval and using its own backup software or code will send the data files to the storage device. Because the host system is not aware of the data backup device, only the specific storage device that is selected by the microcontroller on the schedule basis is visible to the host. To the host, the storage device appears as if it was just manually plugged in by the user.

How a Storage Device is Disconnected to Protect the Stored Data

Once the microcontroller determines that it is time to close the USB storage port to the host, it sends a signal to the multiplexer or interface control chip to perform the operation. The external device appears as if "unplugged" from the host system, thus taking that device off-line and protecting the contents of the storage device. Since the host system is not aware of the data backup device, the host system sees the storage device as if it was just unplugged by the user. The microcontroller would send a code to the multiplexer or interface control chips to close the gate to the particular USB storage port.

How to Switch Between One Storage Device and Another

The microcontroller is programmable via LCD display screen and menu control buttons 4 on the device. The user programs the schedule using the menu control buttons 4 and display screen menus to indicate which device is to be turned on at what time. If a user determines that they need immediate access to any particular device, the user would go into the override menu and select the active port manually. Once the user's task is completed, the user can revert back to running the original schedule as previously programmed. This manual operation mode is selected from the display screen and the data backup device does not execute scheduled code until the operator changes the mode from manual to automatic. The user can also physically disconnect the storage device containing the needed backups and plug it directly into the host, bypassing the data backup device to gain access to the data. This can be useful in rapidly gaining access to the backup data in the event of a system crash/ malware. Furthermore, the operator can at any point remove a storage device from the data backup device by simply unplugging it.

Options for Configuring Storage Devices and Switching Between them

The schedule is what controls which device is visible to the host. The configuration allows for date/time setting and repeated backups, e.g. for example the user can elect to have five (5) daily backups, one weekly and one monthly backup to two different devices. The user would enter the schedule menu and edit as follows:

Storage Device 1 ON Mondays at 6 pm OFF Mondays at 10 pm;

Storage Device 2 ON Tuesdays at 6 pm OFF Tuesdays at 10 pm;

Storage Device 3 ON Wednesday at 6 pm OFF Wednesdays at 10 pm;

Storage Device 4 ON Thursday at 6 pm OFF Thursday at 10 pm;

Storage Device 5 ON Friday at 6 pm OFF Friday at 11:30 pm;

Storage Device 6 ON Saturday at 4 pm OFF Saturday at 8 pm;

Storage Device 7 ON $1^{st}$ Sunday of the January/March/May/July/September/November at 4 pm Off same day at 8 pm; and Storage Device 8—ON 2nd Sunday of February/April/June/August/October/December at 4 pm—off same day at 10 pm.

In another example of a schedule a user can set one backup per week for eight (8) weeks, depending on how many storage devices are connected to the drive.

In another example, the schedule can be of any length desired by the use, e.g. 15 minutes, 30 minutes, 1 hour, 5 hours, or 10 hour, or 12 hour, or other time period.

Backups can be stored in respective USB storage devices 22 on a schedule and/or rotation of respectively scheduled and/or selected USB storage devices, in which the storage devices can be of number ranging from 1 to N USB storage devices 22, e.g. N can be any number n from 1 to a large number, e.g. 2, or 5, or 7, or 10, or 12, or 14, or 30, or 31, or 365 or more, USB storage devices 22.

The number of USB storage devices 22 selected for use by a user can be tailored to a user's desired backup strategy. For example, if a user's organization requires that all daily backups are to be stored offline for a period of 30 days, the operator can order a device that has 30+ storage ports, e.g. USB ports. This approach would achieve the capacity for executing one backup per day which is automatically kept offline on respective USB storage devices. Optionally, the USB storage devices can be reused after 30 days has passed.

The number of USB storage devices can also be dictated by the availability of USB storage devices, or other back up devices and/or backup drives, storage capacity of respective devices and budget of the user. In an example, some users can elect to use an embodiment of the data backup device with 7 or 8 storage ports and use some of user's existing (user's currently owned and available) USB storage devices. Other users, can elect to use an embodiment with greater than 8 ports, or 30 or more ports, or many, e.g. 365 ports.

Example 1—Malware Scenario

In nonlimiting example, when malware infects a host system it can spread through the entire network, infecting all systems on a network, significant portions of a network and/or system(s), deleting backups automatically (as seen with latest versions of ransomware malware), or encrypting everything that it finds connected to the compromised systems. Furthermore, the attacker can manually access tape backup systems if online and erase tapes or other online backup media. This can include external hard drives, flash drives, tapes, network attached storage, and servers, or other non-transitory memory devices, commonly used for storing backups. In this scenario—the malware can actually infect the host system which backs up its data through the device. Once it encounters the device, it does not know of its existence—and the only thing the malware can access is the storage device containing backups from the device that is active on the device—for example if the malware infects the network on Friday at noon—Thursday's data is already backed up and put offline as per schedule, and only Friday's backup device can be visible (if configured that way) to the host and that backup can be deleted by the malware. However, the backups from Monday, Tuesday, Wednesday and Thursday and Saturday/Sunday or a month ago were off-line during the malware attack and therefore could not have been touched by the malware. The organization can fully recover from last day's backup. Furthermore—if the backup device was configured to only be online between 6 pm and Bpm on the same day—the window which the storage device is online is only 2 hours, and after Bpm—all storage devices are again offline, and the next device does not come online until 6-8 pm window the next day (if such configuration is selected by the user).

Example 2—Hacker Scenario

In nonlimiting example, once hackers have gained access to the organization's data and systems, they usually download all the valuable data (Intellectual property, financial or personally identifiable information, or other proprietary data, or other proprietary data) to their own systems and have time to check backup locations and encrypt backups or delete them before launching a ransomware attack towards the compromised organizations systems. This is to ensure that the victim organization or user will have no choice but to pay the ransom to get their data back. Furthermore, the more valuable the data and/or the bigger the organization, the larger ransom amount is demanded. While this device cannot prevent the theft of data already on the host system (for example a file server that is physically connected to the device) it will protect the organizations/users data by keeping off line previously stored backups. If a hacker looked at the storage device connected on Friday at noon he or she would only see the storage device connected for that particular day and not for the days before. Furthermore, with more accurate scheduling which is possible with the device for example storage device can become available for only 30 minutes or 1 hour in that 24-hour period the hacker cannot even notice the device and the backups would not be affected at all.

Consider also that the hacker would not be able to determine that a device is responsible for taking backup devices offline. The USB storage device (such as a USB Flash drive, external hard drive, or other data storage device) would appear as if just plugged in by a user or unplugged by the user at the end of its scheduled online time. The hacker would have no way of knowing that a device is responsible, nor would it be able to know right away of its existence. In addition, the hacker cannot access the microcontroller to force any other storage devices from previous days to come online until the next scheduled task would run again a day, a week, 2 weeks or a month later as per user's specific configuration and schedule.

Example 3

In an embodiment, a device can have the following features, characteristics and methods of operation:
Device is controlled via menu control buttons 4 and small LCD display screen that allows the user to change schedule and define which port is active and therefore controls which USB device (flash drive or hard drive) is visible to host system, which is connected via USB.
Schedule example:
Monday USB storage port 6, i.e. with a first USB flash drive is active from 5 pm to 9 pm;

Tuesday USB storage port 7, i.e. with a second USB flash drive is active from 5 pm to 9 pm;
Wednesday USB storage port 8, i.e. with a third USB flash drive is active from 5 pm to 9 pm;
Thursday USB storage port 9, i.e. with a fourth USB flash drive is active from 5 pm to 9 pm;
Friday USB storage port 10, i.e. with a fifth USB flash drive is active from 5 pm to 9 pm;
Saturday USB storage port 11, i.e. with a sixth USB flash drive is active from 5 pm to 9 pm;
Sunday USB storage port 12 is active i.e. with a seventh USB flash drive is active from 5 pm to 9 pm, which can optionally be a monthly backup;
USB storage port 13 can be used, e.g. for executing a custom defined backup using a thirteenth USB flash drive (in other embodiments N+1 . . . n ports could be used with N+1 . . . n respective USB flash drives, or other data storage device 22 for backup when scheduled to be active);
While one port is active, all other ports are off-line;
Status display screen (Default)—indicates which device is active;
Using third party backup software—such as Windows Backup or Acronis backup, we can schedule the full backup to be stored on the flash or hard drive. Therefore, each USB flash drive contains a full back-up from a different time/day. Thus, giving the operator an off-line backup that cannot be erased or subjected/exposed to ransomware.

Example 4

In another embodiment, a device can have the following features, characteristics and methods of operation:
Approximate dimensions are 10×6×4 inches;
USB can use latest standard, such as USB C (or a previous version i.e. 3.1 generation 2);
N+1 USB Ports are used as storage devices (there is no limit as to number of devices—additional multiplexers and/or hubs just have to be chained together to add more ports);
Storage capacity is limited only to the individual device. (USB flash drives can be used and they are commonly found with 1 TB of space or external hard drives as big as 12 TB can be connected);
1 USB Port is used as host interface;
External AC adapter USB will provide power to the device;
system on chip open source Arduino is used as program controller;
Onboard battery and system clock will make sure the device schedule remains if power is disconnected;
Host can be Desktop/laptop/server—MAC/PC/LINUX or other operating systems;
Data backup device microcontroller is not visible to the host system, only the active USB storage device is.
As used herein, in addition to its ordinary and customary meaning, "host" expressly encompasses any device holding digital information and/or data. Additionally, "host" expressly encompasses any device holding digital information and/or data that can exchange data with data backup device 1 as disclosed herein, e.g. though USB (universal serial bus), NvMe (NvMe, e.g. using a PCI bus) and SATA (serial advanced technology attachment) as well as the cables, connectors and protocols for such bus interfaces, or other technology which can exchange data with data backup device 1.

Example 5

Figure 2:
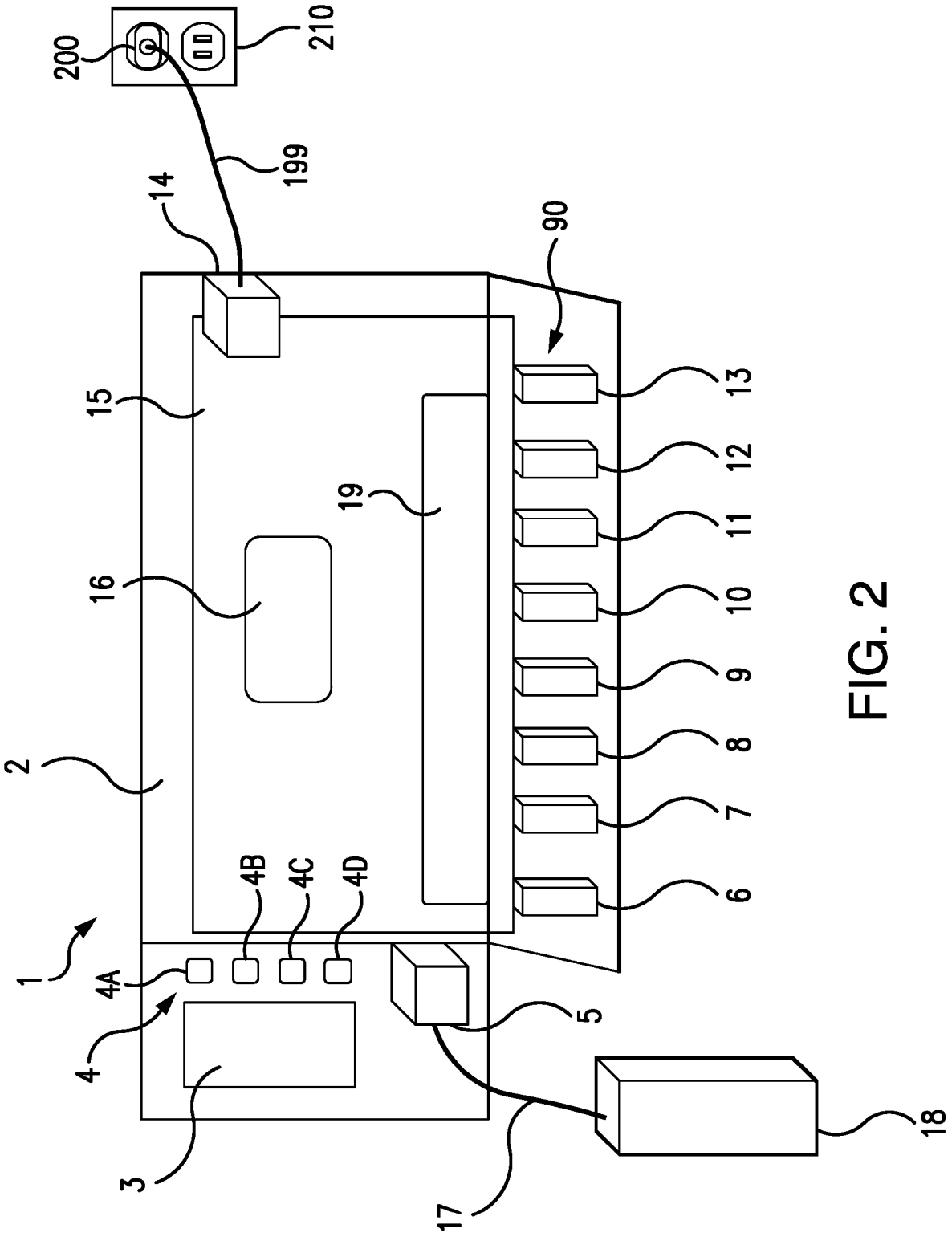
FIG. 2 shows a diagram of an embodiment of an internal view of the device of FIG. 1.

1. Offline Backup Device
   a. FIGS. 1 and 2 show the device from external (FIG. 1) and internal view (FIG. 2)
   b. Using USB Cable 17 the device is connected to the host system (computer/server).
   c. The device can be powered using an AC adapter 20.
   d. The input ports 6-13 are occupied by USB flash drives or external hard drives connected via USB interface.
   e. Using a customizable schedule within the controller 16 the controller manipulates the multiplexer to open and close ports 6-13 visible to the host system 18.
   f. Only one device plugged into storage ports 6-13 is visible, i.e. exposed for data interchange and/or receipt of data and/or downloading of data, to the host system 18 at time. Thus, taking the other storage devices off-line.
2. Plastic 2 Piece (Top/Bottom) Enclosure
   a. This figure shows the plastic enclosure that will encompass the internal components
3. LCD Display Screen for Menu/Status/Configuration
   a. This is a display screen which displays the status, and allows the user to manipulate the configuration/schedule and which port is on at which date/time.
4. Menu Control Buttons to Control Menu/Change Schedule/Program
   a. The menu control buttons 4 are used to manipulate the menu on the display screen and thus control schedule. The menu control buttons 4 are attached to the PCB board and interface with the microcontroller.
5. Host Interface USB
   a. USB interface to accept USB cable which will connect to the host system.
6. Storage Device Interface 1 USB
   a. Standard USB 3.0 Type A interface which will accept a storage device such as flash drive or external hard drive.
7. Storage Device Interface 2 USB
   a. Standard USB 3.0 Type A interface which will accept a storage device such as flash drive or external hard drive.
8. Storage Device Interface 3 USB
   a. Standard USB 3.0 Type A interface which will accept a storage device such as flash drive or external hard drive.
9. Storage Device Interface 4 USB
   a. Standard USB 3.0 Type A interface which will accept a storage device such as flash drive or external hard drive.
10. Storage Device Interface 5 USB
    a. Standard USB 3.0 Type A interface which will accept a storage device such as flash drive or external hard drive.
11. Storage Device Interface 6 USB
    a. Standard USB 3.0 Type A interface which will accept a storage device such as flash drive or external hard drive.
12. Storage Device Interface 7 USB
    a. Standard USB 3.0 Type A interface which will accept a storage device such as flash drive or external hard drive.
13. Storage Device Interface 8 USB
    a. Standard USB 3.0 Type A interface which will accept a storage device such as flash drive or external hard drive.
14. Power Interface [Optional]
    a. Standard power barrel interface that accepts external power supply. USB host port is sufficient to power the device and therefore this AC adapter is optional, however in certain scenarios external power may be required for some embodiments of the device—(e.g.: more than one storage devices are active at the same time and drawing more power).
15. PCB Board
    a. PCB Board which interconnects all components such as microcontroller 16, multiplexer 19, USB ports 6-13, and host port 5 and power port 14, screen 3, menu control buttons 4
16. Microcontroller
    a. Arduino/Raspberry PI type controller or another microcontroller like it
17. USB Cable A to B
    a. USB cable A to B type connectors
18. Host System Computer/Server
    a. Computer/server which can access storage device via USB connection
19. USB Multiplexer 1 to 8
    a. Multiplexer board that allows the microcontroller to select which USB port is visible to host.
    b. The microcontroller 16 controls which multiplexer 19 ports are visible to the host by using logic and schedule within the controller.
20. AC Adapter
    a. Wall plug AC adapter that converts 110 AC into 5V and plugs into the external connector on the device.
21. USB Cable A to a Female
    a. Standard USB Extension Cable
22. USB Flash Drive
    a. Standard USB Flash drive, or hard drive, or SSD drive, of any supported size by the host system (512 GB for example)

Example 6

In another embodiment, a device can have the following features, characteristics and methods of operation.

The operator can connect an external USB hub to any of the storage ports and thus allow multiple storage devices (USB flash drives or external hard drives) to be visible to the host all at the same time. Allowing multiple backups to occur to those different devices at the same time when the storage device port is selected for backup. Those devices will become visible to the host and allow the host read/write to the devices connected through an externally connected USB hub. When the storage port is disconnected, all of the devices on the external USB hub will become offline and no longer visible to the host.

Example 7

In another embodiment, a device can have the following features, characteristics and methods of operation.

The host backup software can be scheduled to run a backup nightly at 9 pm. The device can be configured to turn on the first storage device at 8:55 pm. The storage device will be recognized by the host system and assigned a drive letter (or mount point) prior to scheduled backup taking time. The backup software will store the backup file to a predetermined drive letter (or mount point) and the backup takes 1 hour to complete. The data will flow through the hosts USB port to the device's USB host port, through the multiplexer and/or USB hub to its designated storage device port with the associated storage device connected to it, and be stored on the storage device. The device can be configured to disconnect USB storage port 6 at 10:05 pm and therefore the completed backup is now placed offline. The device will remain idle until the next scheduled event, which can be 8:55 pm the next day, and select the second USB storage port 7 to be active. Furthermore, the backup software on the host can be configured to automatically detect any of the storage backup devices upon its activation by the device controller and begin backup as soon as it is detected. The backup operator must allow sufficient time in the programming of the device for the host backup to fully complete before scheduling the storage port to go offline.

Example 8

In another embodiment, a device can have the following features, characteristics and methods of operation.

To setup the device, the operator will first plug in each of the storage devices directly to the host (bypassing the data backup device) and format each storage device for use with the host system. Each storage device should have a unique drive label (e.g. Monday/Tuesday/Saturday etc., for example) which will help the host's backup software identify the backup device and apply the proper backup plan. Once formatted, the operator will plug in the storage devices to their respective USB storage ports in the data back device 1. Next, the operator will plug the device's USB host port into the USB port of the system to be backed up using a USB cable. Using the device's control panel, which will now be activated and displaying a menu, the operator will set its date and time, and select a default or custom schedule (adjusted to the operators needs and backup window timeframe) and set the device to run in automatic mode. Based on the date and time, the device will execute the scheduled tasks allowing a particular storage port to be turned ON, and making the storage device plugged into it visible to the host. Allowing for the host to transfer the backup file to the selected storage device, and turning the storage port off after the predetermined schedule task is finished.
FIG. 2

FIG. 2 shows a diagram of an embodiment of an internal device.

The device consists of a PCB board (15) that is fixed inside of a plastic enclosure (2). The PCB board interconnects the microcontroller 16—and via PCB board allows the multiplexer 19 to be manipulated through its control interface. The multiplexers USB storage device ports 6-13 are connected to the PCB board and only connected to the multiplexer. The host interface 5 is connected to the PCB board and only connected to the multiplexers host port. The microcontroller is connected to the display screen 3 and menu control buttons 4 by the means of PCB board, or other means and/or capability, for control of the program and operation of the device. The USB Host port 5 is connected to the host system 18 via USB cable. 17. The device has a power port 14 which is connected to the PCB board and provides a single source of power to the components on the PCB board. The device power port is plugged into a 5 v power adapter. 20 which is plugged into the US 110V electrical wall socket.

FIG. 3

Figure 3:
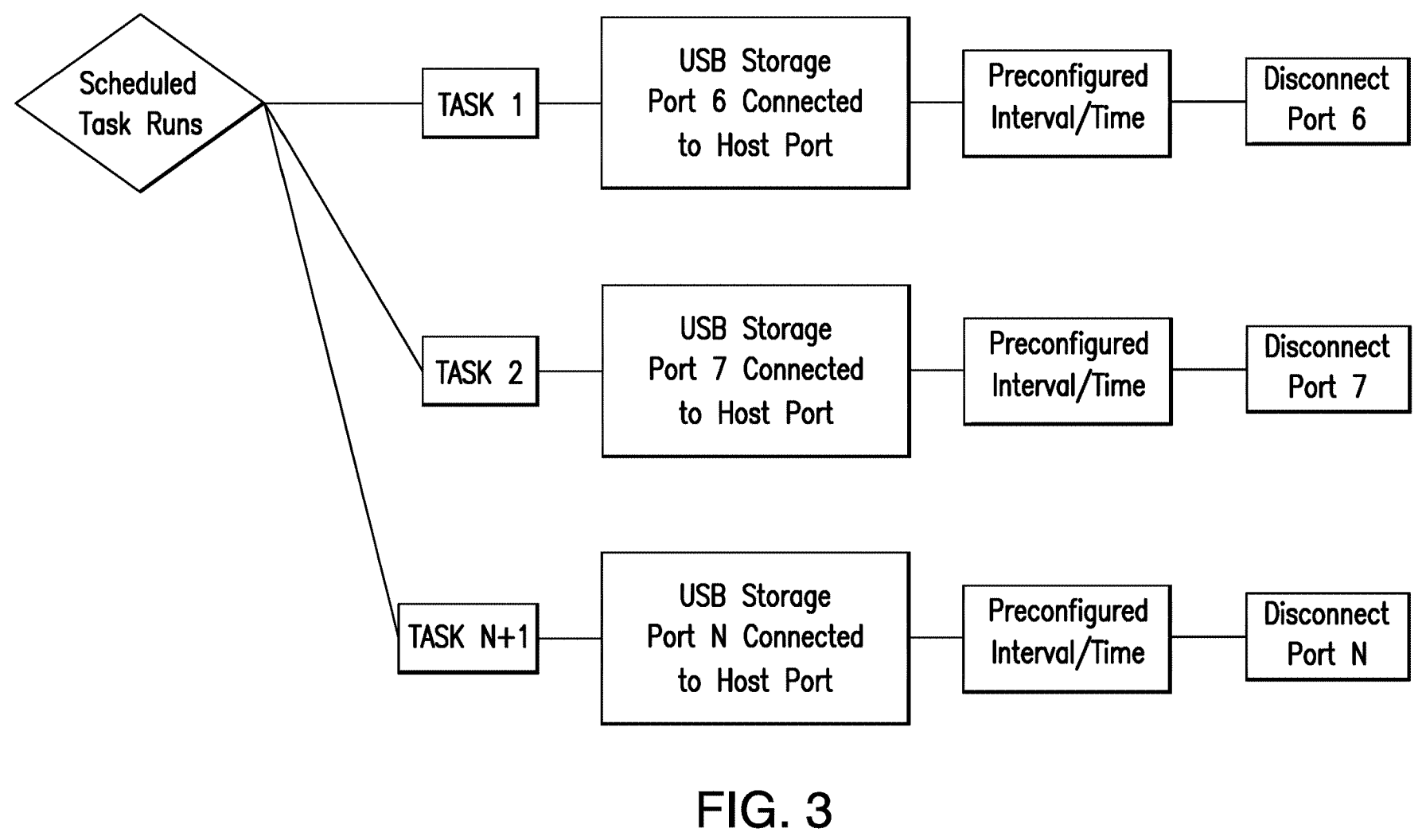

FIG. 3 shows a diagram of an embodiment of controller logic. The controller works on a programmable schedule which depends on the clock and data of the microcontroller. The microcontroller will execute each task at a predefined interval.

Figure 4A:
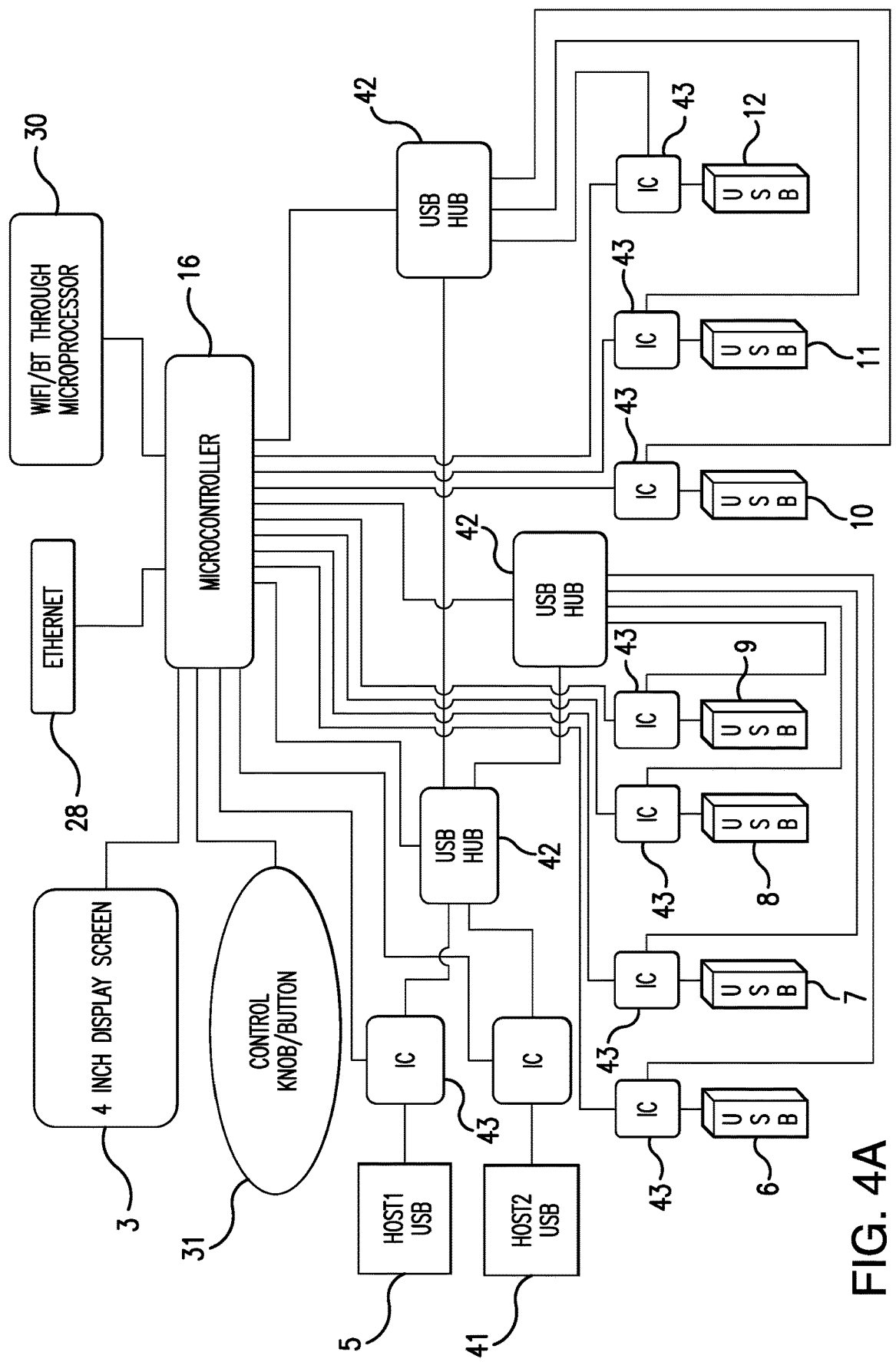
FIG. 4A shows a component diagram of an embodiment of the device of FIG. 1 having USB hubs.

For example, the microcontroller will tell the multiplexer to connect USB storage port 6 to the host via USB host port 5 for a predefined amount of time, and then disconnect USB storage port 6 from the multiplexer 19 by deselection of USB storage port 6 by the microcontroller.
Logic and Programming Using the logic and programming consistent with timing and scheduling, the device will at predefined intervals connect the external host port, to a particular USB Storage port 6 through 13.
FIG. 4A FIG. 4A shows a component diagram of an embodiment of a data backup device using USB hubs.

The embodiment of FIG. 4A shows display screen 3 connected to the microcontroller 16 and control buttons/ knob 31 also connected to the microcontroller. The microcontroller 16 can optionally be outfitted with ethernet 28 and Wifi/Bluetooth (BT) 30. Each USB port 5, 41, 6-12 has a dedicated interface control chip attached to it 43 which allow the microcontroller to manipulate each individual USB port.

FIG. 4A shows the device comprised of nested USB hubs 42, which allow more than one host to be plugged into the data backup device 1, e.g. HOST2 41, in addition to the main host port 5, e.g. HOST1. The microcontroller 16 would on schedule allow the respective host (host port 5 and 41) to interface with any respective predetermined storage device connected through the storage ports (6 through 12) on the USB hub during their scheduled times.

In addition to its ordinary and customary meaning, "nested USB hubs" means USB hubs which are interconnected and configured in a hierarchical structure. For example, "nested USB hubs" expressly encompasses a host which is connected to the main/top/root hub must connect through a data backup device 1's secondary hub to connect to the storage device attached to a subsequent nested hub.

Figure 4B:
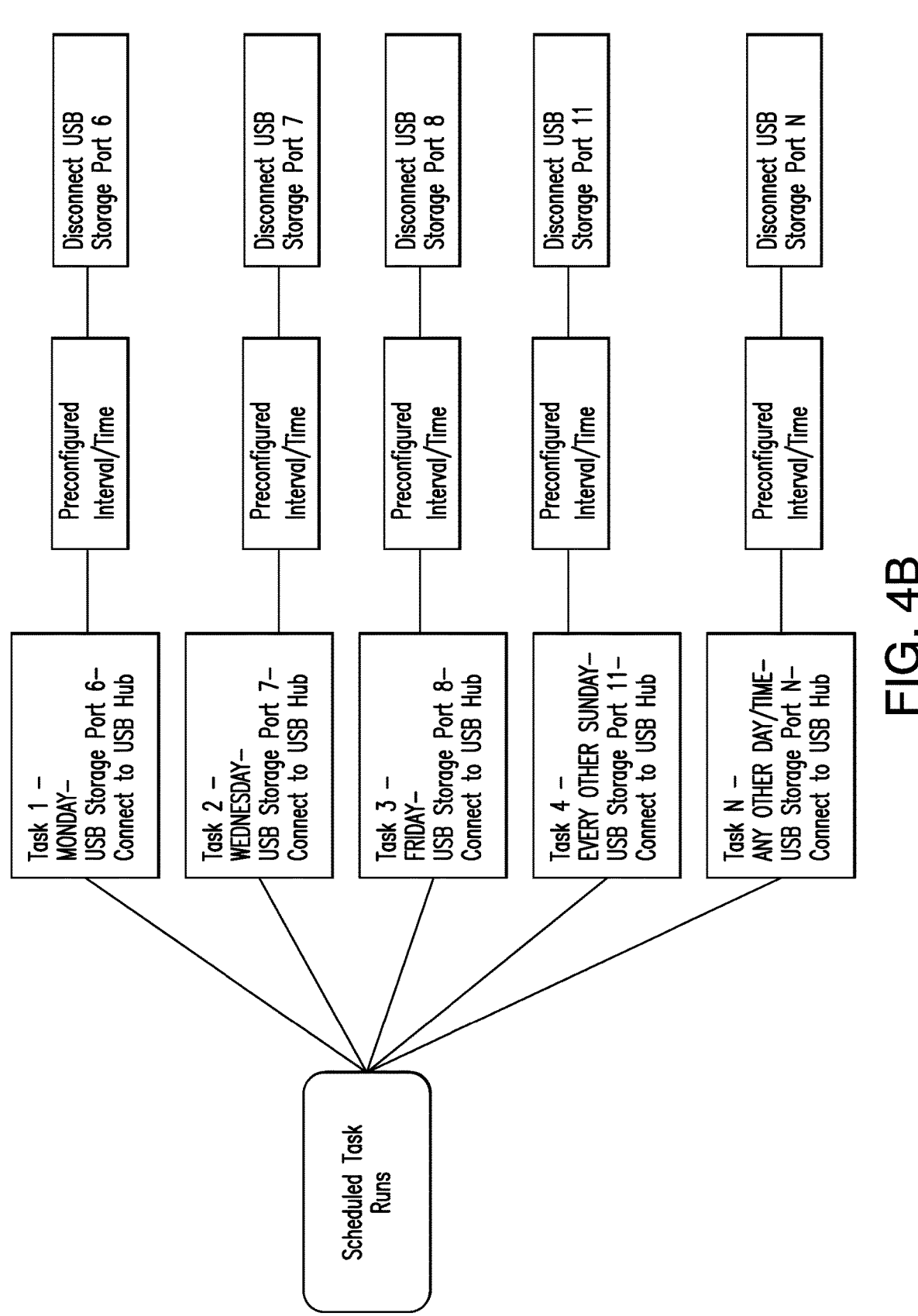
FIG. 4B shows a controller logic diagram of an embodiment of the device of FIG. 1 having USB hubs.
Figure 5:
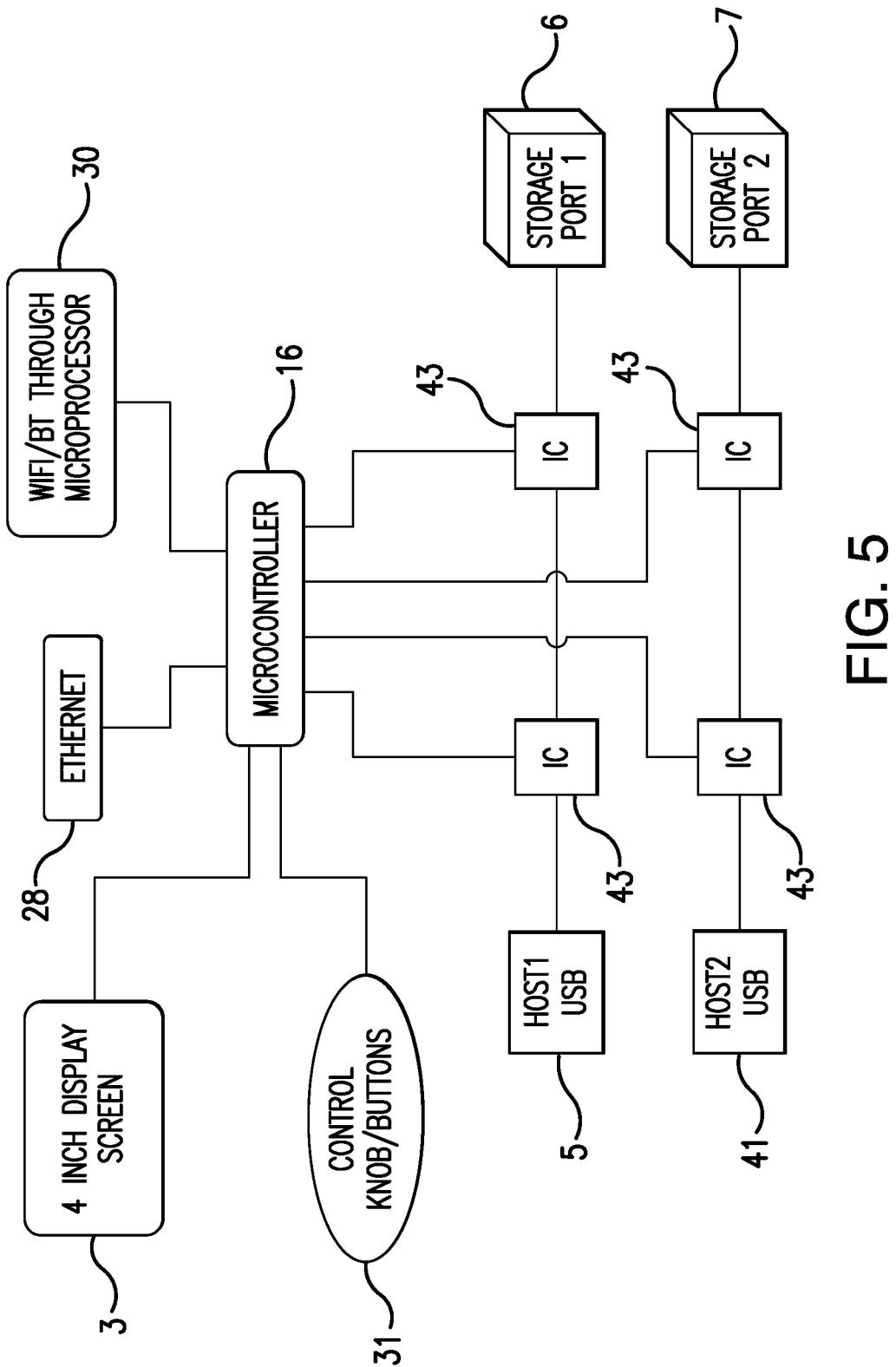
FIG. 5 shows a diagram of an embodiment of an internal device using directly connected interface control chips.

The use of USB Hubs allows the device to be configured in such a way so that all storage ports are visible to one of the hosts at the same time allowing for maintenance/troubleshooting or initial setup of all storage devices prior to running program/schedule which would control access to storage devices on user determined schedule. Using interface control the device can make visible any of the storage devices connected by enabling/disabling that particular USB storage port 90, e.g. USB storage ports 6 through 12, including the port 5, e.g. HOST1, and port 41, e.g. HOST2. For example, the schedule logic would turn on port 5, HOST1, to have access to USB storage port 6 by keeping all other USB storage ports 7 through 12 turned off, while manipulating interface control 43 attached to 6 to enable port 6. Once the schedule window is over, the microcontroller instructs interface control 43 to turn off/disconnect port 6—therefore taking USB storage device 6 offline, as well as taking offline host port 5, e.g. HOST1, by manipulating the host port 5 interface control 43 attached to host port 5, e.g. HOST1.
FIG. 4B FIG. 4B shows a diagram of an embodiment of controller logic for an embodiment having USB hubs In the USB hub embodiment, as shown in FIG. 4A, the microcontroller 16 runs tasks based on a preprogrammed date/time schedule, as shown in FIG. 4B. The scheduled task runs, as shown in FIG. 4B, comprise, for example, a series of tasks, e.g., Task 1, Task 2, Task 3, Task 4 and Task N. The scheduled task runs are not limited to the number of Scheduled Task Runs, as shown in FIG. 4B, but can include more or less Task Runs depending on the desires and needs of the end user. Each Task, i.e., Task1-N, includes a day/time and the USB/IC part to turn on, or make visible to the USB hub. When the preconfigured interval/time starts for task 1, the microcontroller 16 sends a command, for example, to the specified USB storage port to turn on. That particular storage port (6-12), as shown in FIG. 4A, enables the storage device attached to it to be visible to the host by connecting it to the USB hub 42, as shown in FIG. 4A. The host is always connected to the USB hub by its host interface control 43, as shown in FIG. 4A, in this embodiment, but only when the task is executed is the host is able to send backups to the storage device. Upon completion of the time/schedule—the microcontroller 16 sends a command to a respective USB storage port to disconnect. Which in turn makes the storage device no longer visible/connected to the host via the USB hub 42. The next scheduled interval uses the same logic.
FIG. 5

FIG. 5 shows a diagram of an embodiment of an internal device using directly connected interface control chips.

The embodiment of FIG. 5—has display screen 3 connected to the microcontroller 16 and control buttons/knob 31 also connected to the microcontroller. The microcontroller 16 can optionally be outfitted with ethernet 28 and Wifi/Bluetooth (BT) 30. Each USB port 5, 6, 7, 41 has a dedicated interface control chip attached to it 43 which allows the microcontroller to manipulate each individual USB port 5,6,7,41.

FIG. 5 shows a device comprised of direct connected Hosts (5 and 41) to their own respective storage ports (6 and 7). The microcontroller 16 on schedule would make USB storage port 6 into which a first storage device is connected only visible to the host, e.g. HOST1, via host port 5 by controlling the interface controller chip 43. Similarly—the microcontroller can also make a second USB storage device connected to USB storage port 7 visible to a second host, e.g. HOST2, via a second host port 41 on schedule by turning on the respective interface controller chip 43 on both ports. The device in this embodiment, enabled the user with several systems to interconnect multiple storage devices through a single USB backup device and activate individual backup devices on schedule.

In this embodiment, multiple hosts can be backed up and protect by a single data storage device 1. The schedule of backing up multiple devices with a single data storage device 1 can be defined such that each respective host can be backed up to any USB storage device 22 in accordance with scheduling criteria.

The device can also connected to only one host during a given time period for backing up to a specific USB storage device 22, allowing the user to turn on and off the single storage device during specified backup time, to guard against data loss by malware/hackers/human error etc. as discussed in the introduction. The number of hosts and respective storage ports is not limited. The microcontroller can turn on/off multiple one to one connections on schedule by the use of interface controllers.

CONCLUSION

This disclosure regards data backup devices and digital security in their many aspects, features and elements. Such devices and methods can be dynamic in its use and operation. This disclosure is intended to encompass the equivalents, means, capabilities, capacities, systems and methods of the use of data backup devices and digital security and their many aspects consistent with the description and spirit of the apparatus, means, capabilities, capacities, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, capabilities, capacities, systems and methods to achieve the devices, designs, operations, control systems, controls, activities, mechanical actions, dynamics and results disclosed herein. For each data backup device, digital security apparatus, digital security method, process, method, manufacturing method, mechanical element or mechanism disclosed, it is intended that this disclosure also encompasses within the scope of its disclosure and teaches equivalents, means, capabilities, capacities, systems and methods for practicing the many aspects, compounds, processes, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above-described embodiments of the technology as disclosed herein without departing from the spirit and the scope of the claims.

I claim:

1. A device, comprising:
   at least one of a host interface having a means for and capable of exchanging a data between at least one of a host and at least one of a plurality of data exchange interfaces;
   said at least one of a plurality of data exchange interfaces configured to direct said data to at least one of a plurality of storage device ports when said at least one of a plurality of storage device ports is connected to said at least one of a plurality of data exchange interfaces;
   a microcontroller having a microcontroller processor having a non-transitory memory and having said processor executing computer readable program code which executes a first rule-based program logic that compares a first schedule data of at least one of a plurality of schedule data against a first schedule parameter of at least one of a schedule parameter and controls a first data exchange interface of said at least one of a plurality of data exchange interfaces to connect a first storage device port of said at least one of a plurality of storage device ports for receiving said data when said first schedule parameter is satisfied;
   said microcontroller processor executing computer readable program code which controls a transfer of said data between said at least one of a host and directs said data through said first data exchange interface of said at least one of a plurality of data exchange interfaces to said first storage device port of said at least one of a plurality of storage device ports;

said microcontroller processor executing computer readable program code which executes a second rule-based program logic that compares a second schedule data of said at least one of a plurality of schedule data against a second schedule parameter of said at least one of a schedule parameter and controls said first data exchange interface of said at least one of a plurality of data exchange interfaces to disconnect said first storage device port of said at least one of a plurality of storage device ports when said second schedule parameter is satisfied;

said processor executing computer readable program code which executes said first rule-based program logic that compares a third schedule data of said at least one of a plurality of schedule data against a third schedule parameter of said at least one of a schedule parameter and controls a second data exchange interface of said at least one of a plurality of data exchange interfaces to connect a second storage device port of said at least one of a plurality of storage device ports for receiving said data when said third schedule parameter is satisfied;

said microcontroller processor executing computer readable program code which controls a transfer of said data between said at least one of a host and directs said data through said second data exchange interface of said at least one of a plurality of data exchange interfaces to said second storage device port of said at least one of a plurality of storage device ports; and said microcontroller processor executing computer readable program code which executes said second rule-based program logic that compares a fourth schedule parameter of said at least one of a plurality of schedule data against a fourth schedule parameter of said at least one of a schedule parameter and controls said second data exchange interface of said at least one of a plurality of data exchange interfaces to disconnect said second storage device port of said at least one of a plurality of storage device ports when said fourth schedule parameter is satisfied.

2. A device according to claim 1, wherein said at least one of a plurality of storage device ports is connected to a storage device.

3. A device according to claim 2, wherein said storage device is a universal serial bus (USB) flash storage device.

4. A device according to claim 2, wherein said storage device is a serial advanced technology attachment (SATA) storage device.

5. A device according to claim 2, wherein said storage device is a peripheral component interconnect (PCI) storage device.

6. A device according to claim 2, wherein said storage device is a non-volatile memory express (NvMe) storage device.

7. A device according to claim 2, wherein said storage device is a compact-flash based storage device.

8. A device, comprising:

at least one of a host interface having a means for exchanging a data between at least one of a host and at least one of a plurality of data exchange interfaces;

said at least one of a plurality of data exchange interfaces configured to direct said data to at least one of a plurality of storage device ports when said at least one of a plurality of storage device ports is connected to said at least one of a plurality of data exchange interfaces;

a microcontroller having a microcontroller processor having a non-transitory memory and having said processor executing computer readable program code which executes a first rule-based program logic which compares a first schedule data of at least one of a plurality of schedule data against a first schedule parameter of at least one of a schedule parameter and controls a first of said at least one of a plurality of data exchange interfaces to connect a first storage device port of said at least one of a plurality of storage device ports for receiving said data when said first schedule parameter is satisfied; and said microcontroller processor executing computer readable program code which executes a second rule-based program logic that compares a second schedule data of said at least one of a plurality of schedule data against a second schedule parameter of said at least one of a schedule parameter and controls said first data exchange interface of said at least one of a plurality of data exchange interfaces to disconnect said first storage device port of said at least one of a plurality of storage device ports when said second schedule parameter is satisfied said microcontroller processor executing computer readable program code which executes said first rule-based program logic which compares a third schedule data of said at least one of a plurality of schedule data against a third schedule parameter of at least one of a plurality of schedule parameters and controls a second data exchange interface of said at least one of a plurality of data exchange interfaces to connect a second storage device port of said at least one of a plurality of storage device ports for receiving said data when said third schedule parameter is satisfied;

said microcontroller processor executing computer readable program code which executes said second rule-based program logic that compares a fourth schedule parameter of said at least one of a plurality of schedule data against a fourth schedule parameter of said at least one of a schedule parameter and controls said second data exchange interface of said at least one of a plurality of data exchange interfaces to disconnect said second storage device port of said at least one of a plurality of storage device ports when said fourth schedule parameter is satisfied.

9. A device according to claim 8, wherein, said at least one of a plurality of storage device ports is connected to a storage device.

10. A device according to claim 9, wherein said storage device is a USB flash storage device.

11. A device according to claim 9, wherein said storage device is a SATA storage device.

12. A device according to claim 9, wherein said storage device is a PCI storage device.

13. A device according to claim 9, wherein said storage device is a NvMe storage device.

14. A device according to claim 9, wherein said storage device is a compact-flash based storage device.

15. A method, comprising the steps of:

providing at least one of a plurality of data exchange interfaces configured to direct a data to at least one of a plurality of storage device ports when said at least one storage device port of said plurality of storage device ports is connected to said at least one of a plurality of data exchange interfaces;

providing at least one of a data interface between said at least one of a plurality of data exchange interfaces and at least one of a host;

selectively exchanging a data between said at least one of a host and said at least one of said plurality of data exchange interfaces;

providing at least one of a storage device of a plurality of storage devices having a non-transitory memory configured to store said data;

providing at least one of a schedule data of a plurality of schedule data having at least one of a schedule parameter;

providing a microcontroller having a microcontroller processor having a non-transitory memory;

providing said microcontroller processor with executable computer readable program code which executes a first of a rule-based program logic comparing a first schedule data of said at least one of a schedule data of a plurality of schedule data against a first schedule parameter of said least one of a schedule parameter to connect a first storage device port of said at least one of a plurality of storage device ports to a first data exchange interface of said at least one of a plurality of data exchange interfaces;

said microcontroller processor executing computer readable program code which executes a rule-based program logic that controls said first data exchange interface of said at least one of a plurality of data exchange interfaces to direct said data to a first storage device of said at least one of a plurality of storage devices;

said microcontroller processor connecting said first storage device of said at least one of a plurality of storage devices to said first data exchange interface of said at least one of a plurality of data exchange interfaces;

storing said data in the non-transitory memory of said first storage device of said at least one of a plurality of storage devices;

said microcontroller processor executing computer readable program code which executes a rule-based program logic that compares said first schedule data of said at least one of a schedule data of a plurality of schedule data against a second schedule parameter of said at least one of a schedule parameter and controls said first data exchange interface of said at least one of a plurality of data exchange interfaces to disconnect said first storage device port from said first data exchange interface of said at least one of a plurality of data exchange interfaces when said second schedule parameter of said at least one of a plurality of schedule parameters is satisfied;

said microcontroller processor disconnecting said first storage device of said at least one of a plurality of storage devices from said first data exchange interface of said at least one of a plurality of data exchange interfaces;

said microcontroller processor executing computer readable program code which executes said first of a rule-based program logic comparing a third schedule data of said at least one of a schedule data of a plurality of schedule data against a third schedule parameter of said least one of a schedule parameter to connect a second storage device port of said at least one of a plurality of storage device ports to a second data exchange interface of said at least one of a plurality of data exchange interfaces;

said microcontroller processor executing computer readable program code which executes a rule-based program logic that controls said second data exchange interface of said at least one of a plurality of data exchange interfaces to direct said data to a second storage device of said at least one of a plurality of storage devices;

said microcontroller processor connecting said second storage device of said at least one of a plurality of storage devices to said second data exchange interface of said at least one of a plurality of data exchange interfaces;

storing said data in a non-transitory memory of said second storage device of said at least one of a plurality of storage devices;

said microcontroller processor executing computer readable program code which executes a rule-based program logic that compares a fourth schedule data of said at least one of a schedule data of a plurality of schedule data against a fourth schedule parameter of said at least one of a schedule parameter and controls said second data exchange interface of said at least one of a plurality of data exchange interfaces to disconnect said second storage device port from said second data exchange interface of said at least one of a plurality of data exchange interfaces when said fourth schedule parameter of said at least one of a plurality of schedule parameters is satisfied; and said microcontroller processor disconnecting said second storage device of said at least one of a plurality of storage devices from said second data exchange interface of said at least one of a plurality of data exchange interfaces.

16. The method according to claim 15, wherein, the step of connecting said first storage device to said first data exchange interface comprises reversibly digitally connecting said first storage device of said at least one of a plurality of storage devices to said first storage device port, and the step of connecting said second storage device to said second data exchange interface comprises reversibly digitally connecting said second storage device of said at least one of a plurality of storage devices to said second storage device port.

17. The method according to claim 15, wherein, the step of disconnecting said first storage device from said first data exchange interface comprises reversibly digitally disconnecting said first storage device of said at least one of a plurality of storage devices from said first storage device port, and the step of disconnecting said second storage device from said second data exchange interface comprises reversibly digitally disconnecting said second storage device of said at least one of a plurality of storage devices from said second storage device port.

18. The method according to claim 15, wherein, the step of connecting said first storage device to said first data exchange interface comprises reversibly physically connecting said first storage device of said at least one of a plurality of storage devices to said first storage device port, and the step of connecting said first storage device to said second data exchange interface comprises reversibly physically connecting said second storage device of said at least one of a plurality of storage devices to said second first storage device port.

19. The method according to claim 15, wherein, the step of disconnecting said first storage device from said first data exchange interface comprises reversibly physically disconnecting said first storage device of said at least one of a plurality of storage devices from said first storage device port, and the step of disconnecting said second storage device from said second data exchange interface comprises reversibly physically disconnecting said second storage device of said at least one of a plurality of storage devices from said second storage device port.

20. The method according to claim 15, wherein, the step of said microcontroller connecting said first storage device of said at least one of a plurality of storage devices to said first data exchange interface of said at least one of a plurality of data exchange interfaces is based upon said first schedule parameter of said at least one of a plurality of schedule parameters having at least one of a time and at least one of a date, or at least one of a time and day, criteria, and the step of said microcontroller connecting said second storage device of said at least one of a plurality of storage devices to said second data exchange interface of said at least one of a plurality of data exchange interfaces is based upon said second schedule parameter of said at least one of a plurality of schedule parameters having at least one of a time and at least one of a date, or at least one of a time and day, criteria.

21. The method according to claim 15, further comprising the steps of:

providing at least one of a plurality of storage device ports between said at least one of a data exchange interface of said plurality of data exchange interfaces and said at least one of a plurality of storage devices, wherein said at least one of a storage device is removably connected to said at least one of a storage device port of said at least one of a plurality of storage device ports;

protecting said data stored on said first storage device by disconnecting said first storage device from said first storage device port of said at least one of a plurality of storage device ports, and protecting said data stored on said second storage device by disconnecting said second storage device from said second storage device port of said at least one of a plurality of storage device ports.

22. The method according to claim 21, further comprising the steps of:

providing a digital switch controlled by said microcontroller processor for disconnecting said first storage device from said first storage device port of said at least one of a plurality of storage device ports, and providing a digital switch controlled by said microcontroller processor for disconnecting said second storage device from said second storage device port of said at least one of a plurality of storage device ports.

23. The method according to claim 21, further comprising the steps of:

providing a physical switch for disconnecting said first storage device from said first storage device port at least one of a plurality of storage device ports, and providing a physical switch for disconnecting said second storage device from said second storage device port at least one of a plurality of storage device ports.

24. The method according to claim 15, wherein the step of providing at least one storage device of a plurality of storage devices includes providing said at least one storage device of said plurality of storage devices that is a USB flash storage device.

25. The method according to claim 15, wherein the step of providing at least one storage device of a plurality of storage devices includes providing said at least one storage device of said plurality of storage devices that is a SATA storage device.

26. The method according to claim 15, wherein the step of providing at least one storage device of a plurality of storage devices includes providing said at least one storage device of said plurality of storage devices that is a PCI storage device.

27. The method according to claim 15, wherein the step of providing at least one storage device of a plurality of storage devices includes providing said at least one storage device of said plurality of storage devices that is a NvMe storage device.

28. The method according to claim 15, wherein the step of providing at least one storage device of a plurality of storage devices includes providing said at least one storage device of said plurality of storage devices that is a compact-flash based storage device.

* * * * *